United States Patent
Cho

(10) Patent No.: US 11,544,759 B2
(45) Date of Patent: Jan. 3, 2023

(54) SYSTEM AND METHOD FOR PROVIDING SIMILAR OR RELATED PRODUCTS BASED ON DEEP-LEARNING

(71) Applicant: NHN CLOUD CORPORATION, Gyeonggi-do (KR)

(72) Inventor: Myounghoon Cho, Gyeonggi-do (KR)

(73) Assignee: NHN CLOUD CORPORATION, Gyeonggi-Do (KR)

( * ) Notice: Subject to any disclaimer, the term of this patent is extended or adjusted under 35 U.S.C. 154(b) by 327 days.

(21) Appl. No.: 16/789,353

(22) Filed: Feb. 12, 2020

(65) Prior Publication Data
US 2020/0265495 A1    Aug. 20, 2020

(30) Foreign Application Priority Data
Feb. 14, 2019   (KR) .................. 10-2019-0017009

(51) Int. Cl.
*G06Q 30/06*    (2012.01)
*G06F 16/583*   (2019.01)
(Continued)

(52) U.S. Cl.
CPC ..... *G06Q 30/0629* (2013.01); *G06F 16/5854* (2019.01); *G06Q 30/0643* (2013.01);
(Continued)

(58) Field of Classification Search
CPC ..... G06F 9/3887; G06V 10/82; G06V 10/454
See application file for complete search history.

(56) References Cited

U.S. PATENT DOCUMENTS 8,908,962 B2 * 12/2014 Bhardwaj ................. G06T 7/13
                                                          382/165
9,235,859 B2 *  1/2016 Bhardwaj .......... G06Q 30/0643
(Continued)

FOREIGN PATENT DOCUMENTS

CN      107408119     11/2017
JP      2017-220019   12/2017
(Continued)

OTHER PUBLICATIONS

Office Action dated Jul. 13, 2020 for Korean Patent Application No. 10-2019-0017009 and its English translation from Global Dossier (issued as KR 10-2246408).
(Continued)

*Primary Examiner* — Yosef Kassa
(74) *Attorney, Agent, or Firm* — Ladas & Parry, LLP

(57) ABSTRACT

A method for providing similar or related products based on deep-learning, which is performed by a data processing unit of a shopping mall server, includes: acquiring an item image and item information for an item registered in a shopping mall; detecting bounding boxes for one or more objects by object-detecting the item image; setting a bounding box for an object associated with the item based on the item information; creating a main bounding box image by cropping a portion of the item image in the set bounding box; creating a padding image by padding-processing the main bounding box image; extracting a feature vector for the padding image; matching the feature vector with the item and storing the feature vector in a database; and creating the database for a similar or related product search service.

17 Claims, 6 Drawing Sheets

(51) Int. Cl.
*G06T 7/10* (2017.01)
*G06T 11/20* (2006.01)

(52) U.S. Cl.
CPC ............... *G06T 7/10* (2017.01); *G06T 11/20* (2013.01); *G06T 2207/20081* (2013.01); *G06T 2207/20084* (2013.01); *G06T 2207/20132* (2013.01); *G06T 2210/12* (2013.01)

(56) References Cited

U.S. PATENT DOCUMENTS

| | | | | |
|---|---|---|---|---|
| 9,823,744 | B2* | 11/2017 | Publicover | G06F 3/0304 |
| 9,886,653 | B2* | 2/2018 | Bhardwaj | G06K 9/6217 |
| 9,990,687 | B1* | 6/2018 | Kaufhold | G06V 10/82 |
| 10,380,650 | B2* | 8/2019 | Hamedi | G06Q 30/0204 |
| 10,515,303 | B2* | 12/2019 | Lie | G06F 9/3887 |
| 10,702,242 | B2* | 7/2020 | de Jonge | A61B 8/52 |
| 10,726,312 | B2 | 7/2020 | Butt et al. | |
| 10,789,525 | B2* | 9/2020 | Kerr | G06F 16/583 |
| 10,795,928 | B2 | 10/2020 | Matsubara et al. | |
| 10,810,252 | B2* | 10/2020 | Kerr | G06F 16/5838 |
| 10,956,928 | B2* | 3/2021 | Sewak | G06Q 30/0271 |
| 10,977,748 | B2* | 4/2021 | Bostick | G06Q 50/01 |
| 10,984,757 | B2 | 4/2021 | Okamoto | |
| 11,113,587 | B2 | 9/2021 | Butt et al. | |
| 2018/0081908 | A1 | 3/2018 | Matsubara et al. | |
| 2018/0157939 | A1 | 6/2018 | Butt et al. | |
| 2020/0219467 | A1 | 7/2020 | Okamoto | |
| 2020/0320356 | A1 | 10/2020 | Butt et al. | |
| 2021/0256937 | A1 | 8/2021 | Okamoto | |

FOREIGN PATENT DOCUMENTS

| | | |
|---|---|---|
| JP | 2018-165926 | 10/2018 |
| JP | 2018-194842 | 12/2018 |
| KR | 10-2017-0026264 | 3/2017 |
| KR | 10-1768521 | 8/2017 |
| KR | 10-1852598 | 4/2018 |
| KR | 10-2246408 | 5/2021 |
| WO | 2018/102919 | 6/2018 |

OTHER PUBLICATIONS

Notice of Allowance dated Jan. 26, 2021 for Korean Patent Application No. 10-2019-0017009 and its English translation from Global Dossier (issued as KR 10-2246408).
Office Action dated Mar. 30, 2021 for Japanese Patent Application No. 2020-023644 and its English translation from Global Dossier.
Notice of Allowance dated Dec. 7, 2021 for Japanese Patent Application No. 2020-023644 and its English translation from Global Dossier.

* cited by examiner

[FIG. 1]
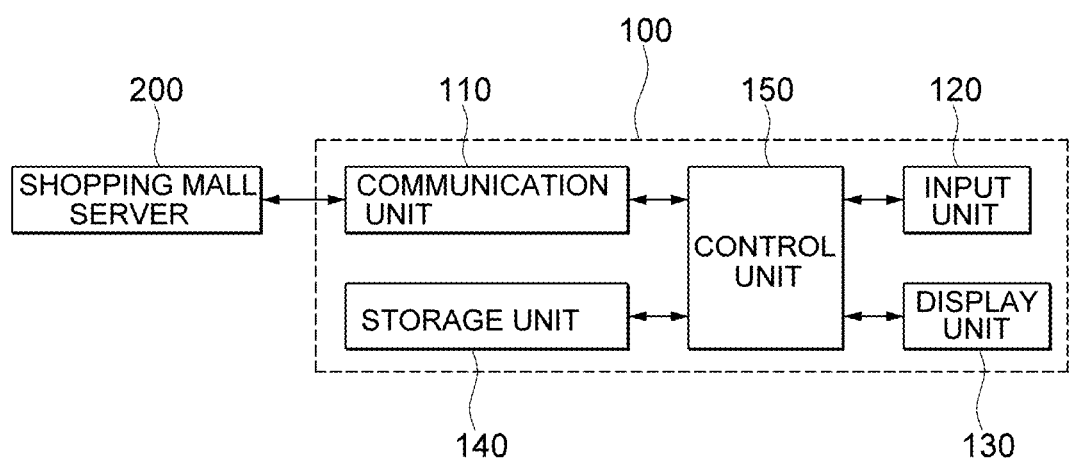
[FIG. 2]
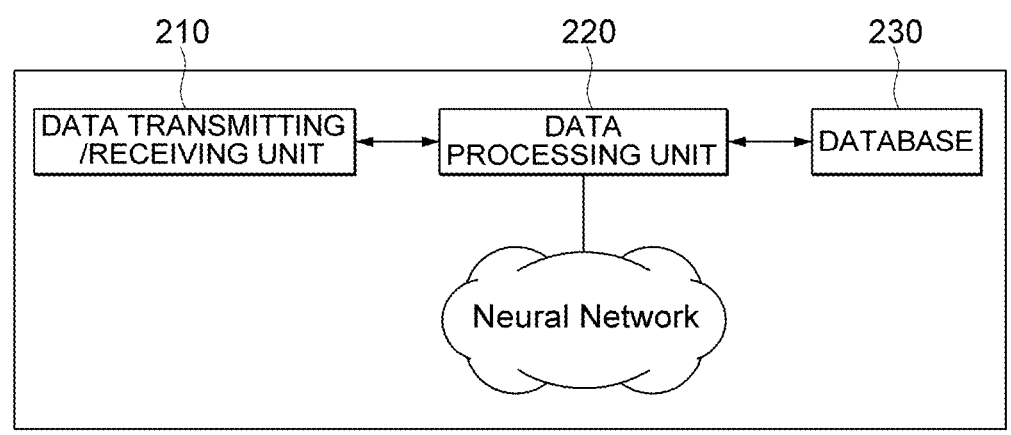

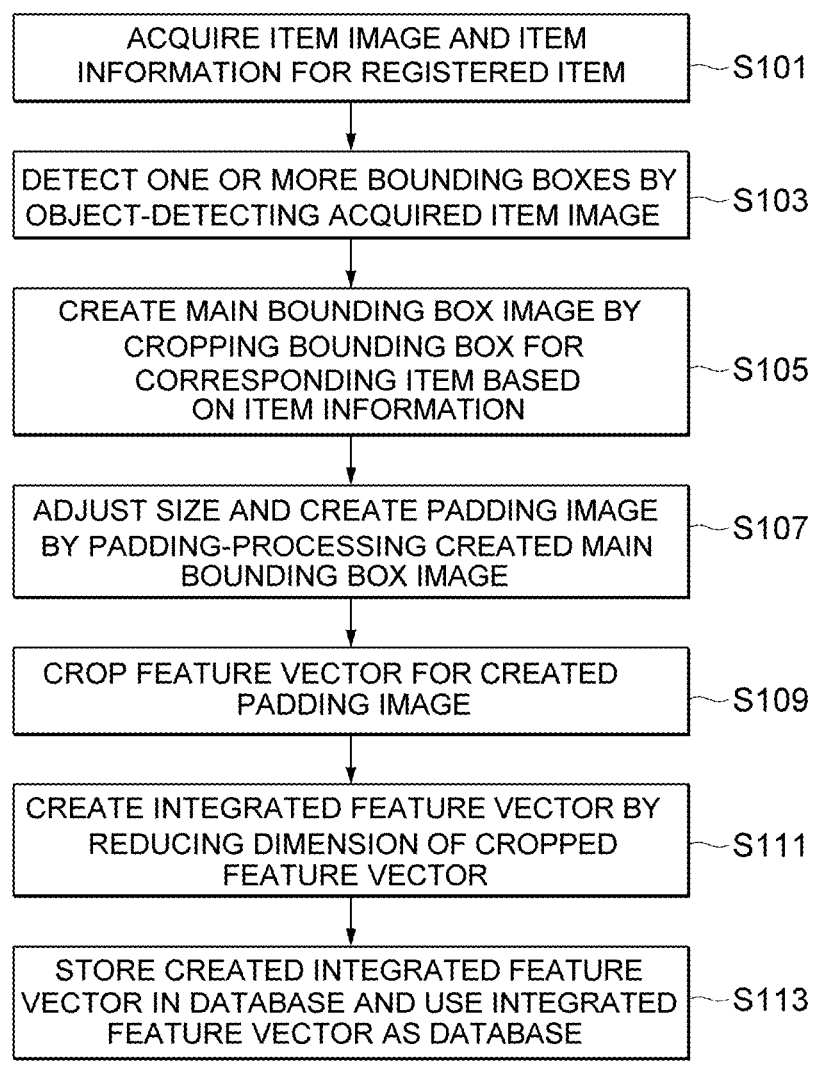
[FIG. 3]

[FIG. 4]
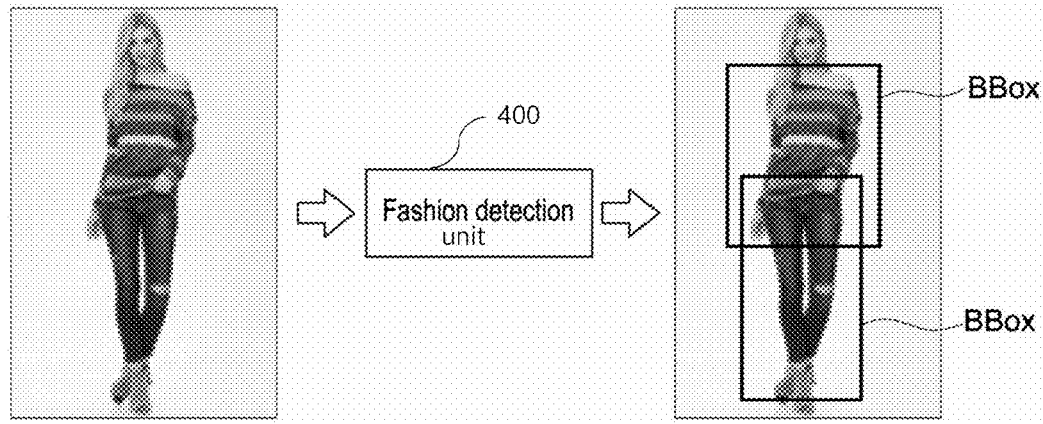
[FIG. 5]
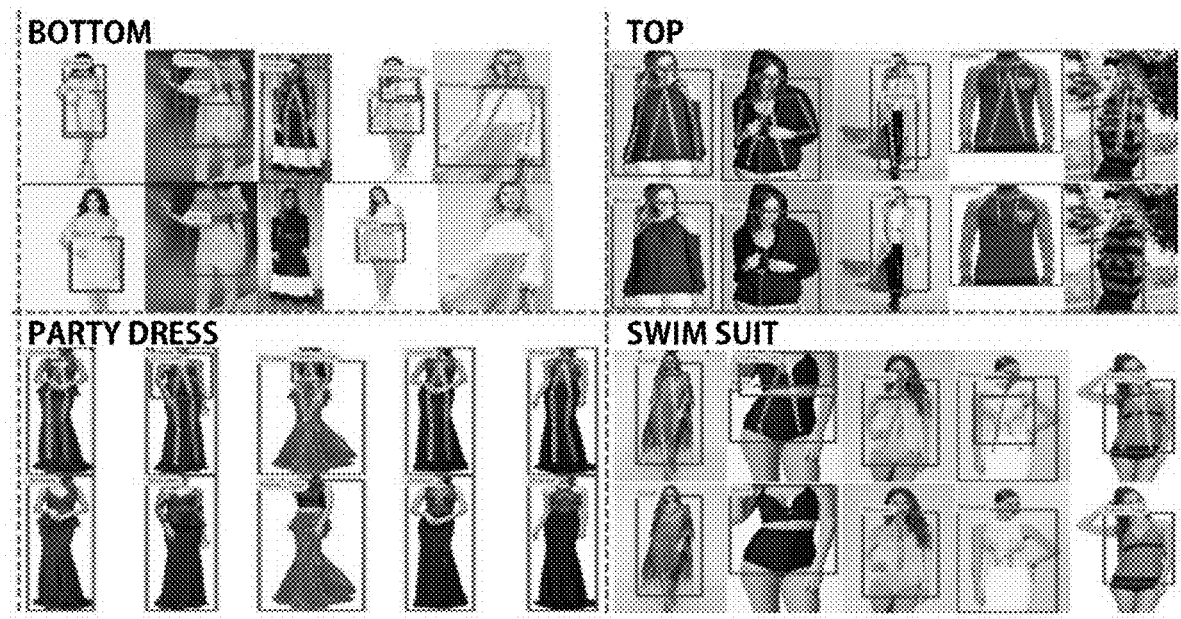

[FIG. 6]
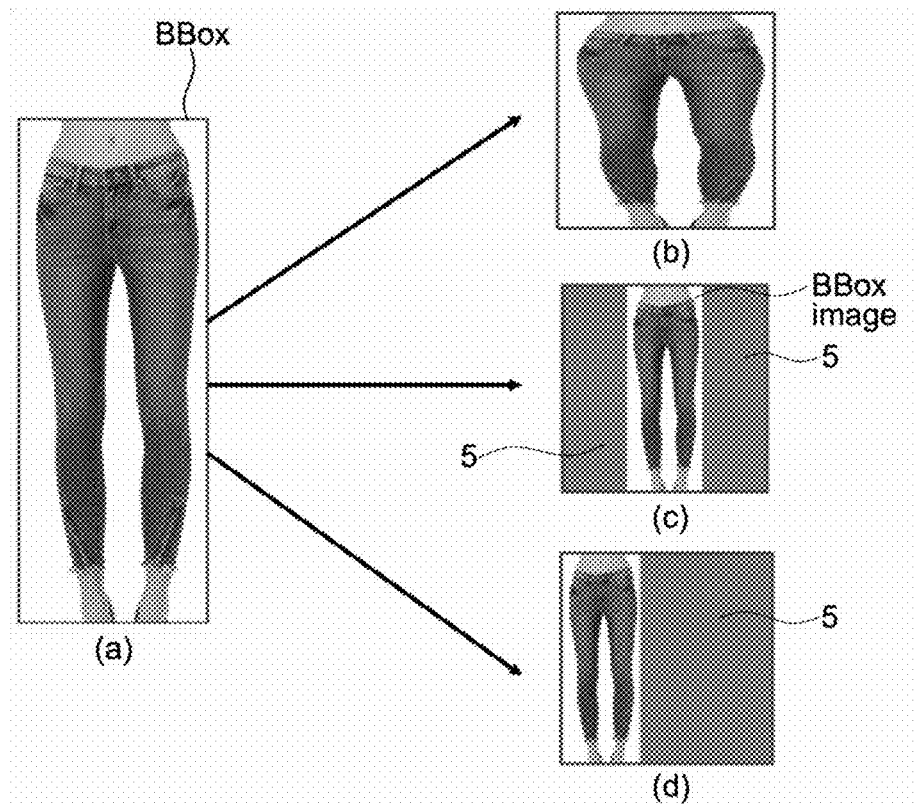
[FIG. 7]
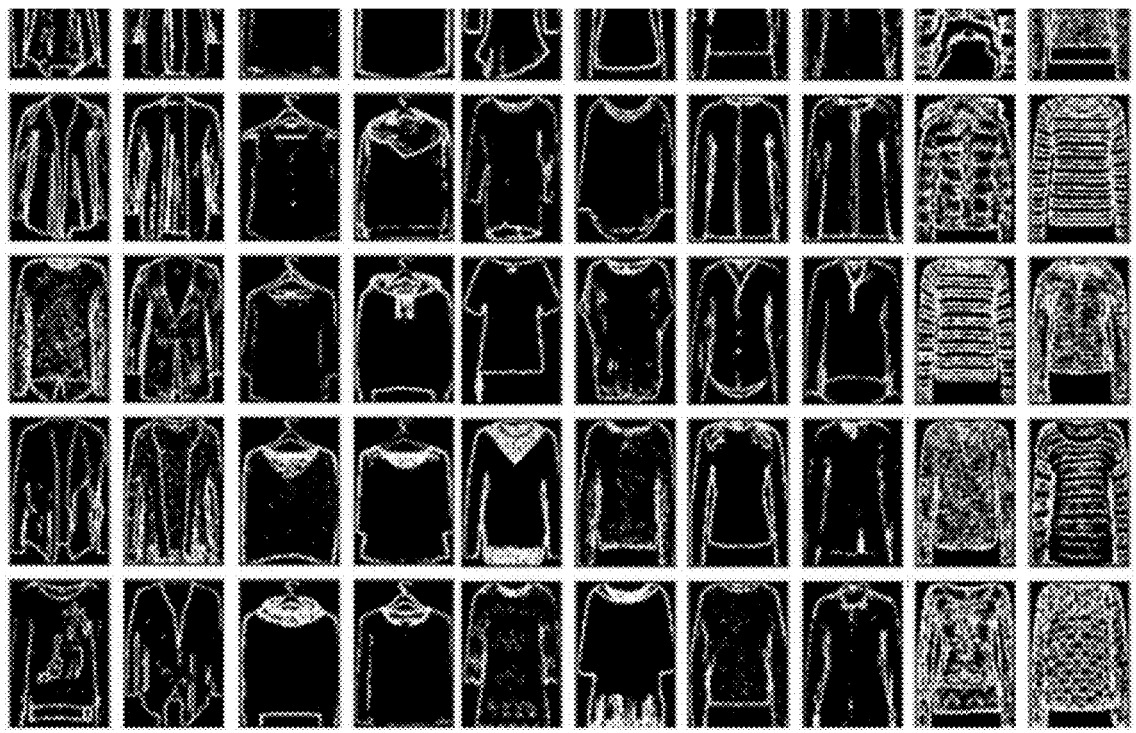

[FIG. 8]
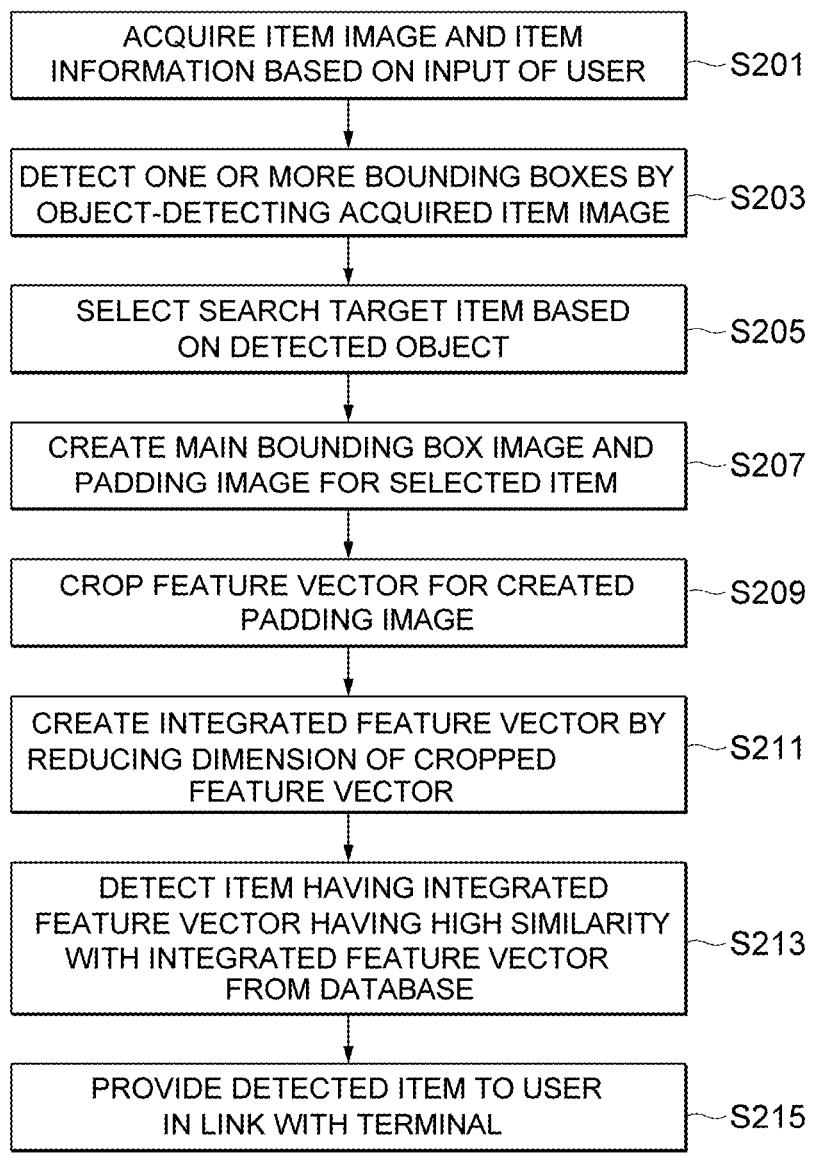

[FIG. 9]
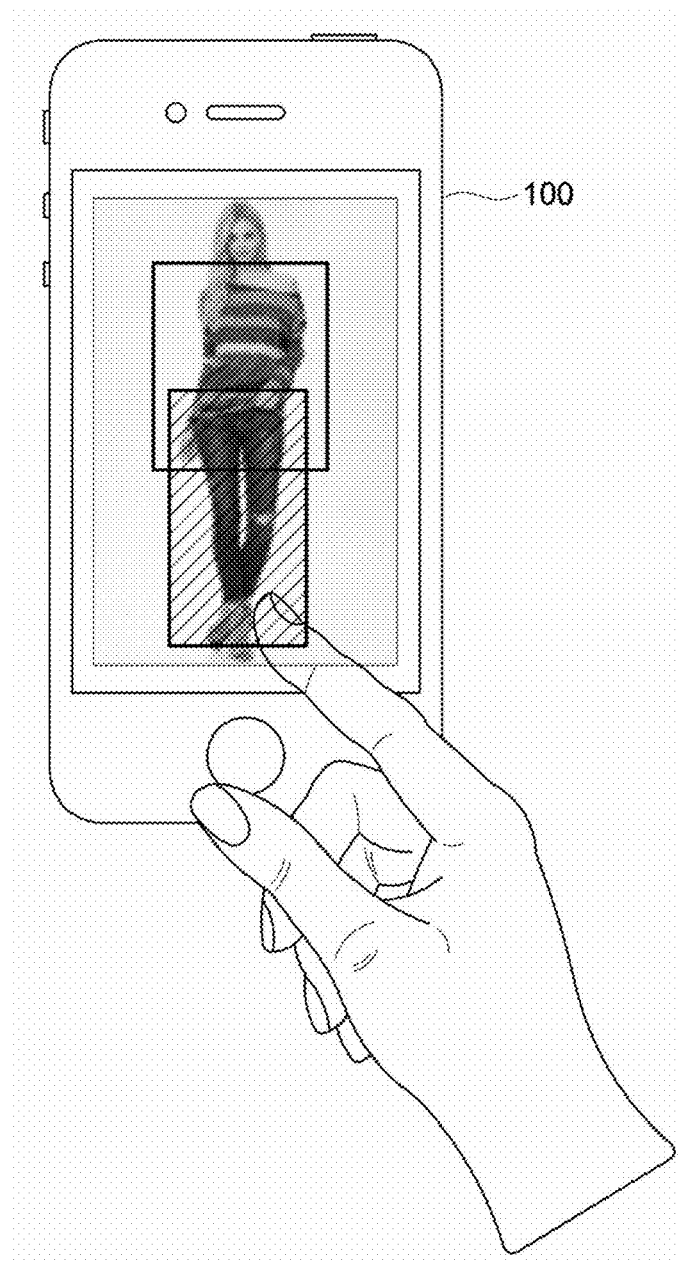

SYSTEM AND METHOD FOR PROVIDING SIMILAR OR RELATED PRODUCTS BASED ON DEEP-LEARNING

CROSS REFERENCE TO RELATED APPLICATION(S)

This application claims the priority to Korean Patent Application No. 10-2019-0017009, filed on Feb. 14, 2019, which is all hereby incorporated by reference in its entirety.

BACKGROUND

Technical Field

The present disclosure generally relates to a system and method for detecting or providing similar or related products based on deep-learning. More particularly, some embodiments of the present disclosure relate to a system or method for detecting or providing similar or related products by deep-learning an object region of a product image.

Related Art

A field of studying an algorithm for performing prediction and/or classification based on attributes learned through training data. A neural network is a field of machine learning.

Many studies of scholars in the related art are made in order to increase accuracy of the neural network. In particular, the accuracy of model equations is enhanced by using optimization theory and various kernel functions. Further, with the advent of big-data technology, enormous data or information can be used for modeling and the accuracy can be also enhanced.

Here, we call combining big data with the neural network as deep-learning.

Specifically, the deep-learning may be defined as, for example, but not limited to, a set of machine learning algorithms that attempt high-level abstractions (e.g. tasks of summarizing core contents or functions in large amounts of data or complex data) through a combination of several non-linear transformation techniques.

In other words, in the deep-learning, computers replace humans to analyze and process vast amounts of data and cluster and classify objects or data.

Meanwhile, in the modern society, with the development of various Information &Communications Technologies (ICT) including the deep-learning, an online shopping mall industry has kept growing.

An online shopping mall may refer to, for example, but not limited to, a place where products can be purchased and sold online through a network such as the Internet.

Such an online shopping mall has required differentiated services that can increase competitiveness of shopping malls due to a rapid increase in the number of individuals and businesses and required various solutions for providing the services.

When products that a user wants to purchase are sold out at a specific online shopping mall, the possibility that the user keeps shopping at that online shopping mall is low, and as a result, a purchase rate ma be reduced and introduction for a service for solving such a problem is required.

Further, when the product is searched in the online shopping mall, the user has needs to check whether other products similar to the searched product can be present in the corresponding shopping mall, but there is a lack of technology that can conveniently identify a similar or related product associated with the product desired by the user with respect to various quantity of products which are present in the online shopping mall, and as a result, there is a need for a solution for such a lack.

Further, when the product is searched on the online shopping mall, a name for the product cannot be known, and as a result, there is a case in which it is difficult to find the product by a conventional search method (e.g., category, keyword search, etc.). Therefore, there is a need for introduction of technology capable of solving such a problem.

In other words, in the technical field, there is a demand for development of technology for increasing satisfaction of online shoppers by providing convenience of basic usability of a current online shopping mall and providing a search method differentiated from the conventional method.

SUMMARY

The present disclosure has been made in an effort to implement a deep-learning based computerized service for detecting or providing similar or related products that may be capable of increasing competitiveness of an online shopping mall by providing convenience of basic usability of the online shopping mall and providing a search method differentiated from a conventional method.

However, a technical object to be achieved by the present disclosure and an exemplary embodiment of the present invention is not limited to the technical objects and there may be other technical objects.

In an aspect, provided is a method for providing similar products based on deep-learning, which is performed by a data processing unit of a shopping mall server, which includes: acquiring an item image and item information for an item registered in a shopping mall; detecting bounding boxes for one or more objects by object-detecting the item image; determining a bounding box for an object associated with the item based on the item information; creating a main bounding box image by cropping an image in the determined bounding box; creating a padding image by padding-processing the main bounding box image; cropping a feature vector for the padding image; matching the feature vector with the item and storing the feature vector in a database; and providing the database based similar product search service.

In this case, the detecting of the bounding box for the object may include fashion-detecting the item image to crop a bounding box for a region occupied by one or more fashion associated objects and a region occupied by the fashion associated object.

Further, the determining of the bounding box for the object associated with the item based on the item information may include determining a bounding box for an object associated with the item among the detected fashion associated objects.

In addition, the creating of the main bounding box image by cropping the image in the determined bounding box may include, when there is a plurality of bounding boxes determined as the object associated with the item, merging the plurality of bounding boxes, and cropping the image in the merged bounding boxes.

Further, the creating of the padding image may include changing the main bounding box image to a predetermined size, and performing padding processing of adding the pad image onto the size-changed main bounding box image.

In addition, the cropping of the feature vector for the padding image may include cropping a feature vector for at least one parameter of texture, fabric, shape, style, and color parameters using a deep-learning neural network.

Further, the method may further include creating an integrated feature vector by reducing a dimension of the cropped feature vector, in which the matching of the feature vector with the item and storing of the feature vector in the database may include matching the item information with the integrated feature vector and storing the item information in the database.

Further, in another aspect, provided is a method for detecting and providing similar products through deep-learning, which is performed by a data processing unit of a shopping mall server, which includes: acquiring an item image and item information for an item selected by a user; detecting one or more objects by object-detecting the item image and creating a bounding box for a region of the object; determining a search target item based on the detected object; creating a main bounding box image by cropping an image in a bounding box of an object associated with the search target item; creating a padding image by padding-processing the main bounding box image; cropping a feature vector by deep-learning the padding image; detecting an item having a feature vector of which a similarity with the feature vector is equal to or more than a predetermined criterion from a database and selecting the detected item as a similar item; and providing the selected similar item through a terminal of the user.

In this case, the acquiring of the item image and the item information may include acquiring the item image and the item information of the item selected according to an input of the user among a plurality of items posted on a shopping mall in link with the terminal, and acquiring the item image and the item information based on an image input by the user through an interface provided by the shopping mall in link with the terminal.

Further, the determining of the search target item based on the detected object may include automatically determining the search target item based on the item information.

Further, the determining of the search target item based on the detected object may further include displaying an item image including the one or more bounding boxes through the terminal, and determining the object included in the bounding box selected by the user as the search target item based on the item image including the displayed bounding box.

Further, the detecting of the item from the database and the selecting of the detected item as the similar item may include detecting n upper items in which the similarity is equal to or more than a predetermined criterion from the database.

Further, in yet another aspect, provided is an apparatus providing similar products based on deep-learning, which includes: a communication unit transmitting/receiving shopping service associated data to/from a shopping mall server; a storage unit storing data for providing the shopping service; a display unit outputting an image of a product selected by a user in the shopping service; and a control unit performing a function of providing an image of a similar product associated with the image of the product during a process of providing the shopping service, in which the control unit controls to acquire a product image and product information of the product selected by the user, detect one or more objects by object-detecting the product image and create a bounding box for a region of the object, determine a search target product based on the detected object, create a main bounding box image by cropping an image in a bounding box of an object associated with the search target product, create a padding image by padding-processing the main bounding box image, crop a feature vector by deep-learning the padding image, detect a product having a feature vector of which a similarity with the feature vector is equal to or more than a predetermined criterion from a database and select the detected product as the similar product, and output the selected similar product through the display unit.

In this case, the control unit may control to acquire the product image and the product information of the product selected according to the input of the user among a plurality of product images output to the display unit.

Further, the control unit may control to automatically determine one of a plurality of products included in the product image as the search target product based on the product information.

Further, the control unit may control to display a product image including the one or more bounding boxes through the display unit, and determine the object included in the bounding box selected by the user as the search target product based on the product image including the displayed bounding box.

Further, the control unit may control to detect n upper products in which the similarity is equal to or more than a predetermined criterion from the database of the shopping mall server through the communication unit.

BRIEF DESCRIPTION OF THE DRAWINGS

FIG. 1 is a block diagram of a terminal according to an exemplary embodiment of the present disclosure.

FIG. 2 is a block diagram of a shopping mall server according to an exemplary embodiment of the present disclosure.

FIG. 3 is a flowchart for describing a method for creating a database for providing similar or related products based on deep-learning according to an exemplary embodiment of the present disclosure.

FIG. 4 illustrates an example of creating a bounding box by object-detecting an item image according to an exemplary embodiment of the present disclosure.

FIG. 5 is a diagram for describing a process of creating a main bounding box image according to an exemplary embodiment of the present disclosure.

FIG. 6 is a diagram for describing a process of creating a padding image according to an exemplary embodiment of the present disclosure.

FIG. 7 illustrates examples of cropping a feature vector according to an exemplary embodiment of the present disclosure.

FIG. 8 is a flowchart for describing a method for detecting and providing similar or related products from a database based on deep-learning according to an exemplary embodiment of the present disclosure.

FIG. 9 illustrates an example of selecting a search target item with an input of a user through a terminal according to an exemplary embodiment of the present disclosure.

DESCRIPTION OF EXEMPLARY EMBODIMENTS

The present invention may have various modifications and various embodiments and specific embodiments will be illustrated in the drawings and described in detail in the detailed description. Effects and features of the present disclosure, and methods for accomplishing the same will be more clearly understood from exemplary embodiments described in detail below with reference to the accompanying drawings. However, the present disclosure is not limited to embodiments disclosed below but may be implemented in various forms. In the following exemplary embodiment, the terms such as first, second, etc., are not restrictive meanings but are used for distinguishing one component from other components. Further, a singular form may include a plural form if there is no clearly opposite meaning in the context. Further, the terms such as "include" or "have" mean that there is a feature or a component disclosed in the specification and a possibility that one or more other features or components will be added is not pre-excluded. In addition, in the drawing, for convenience of description, sizes of the components may be exaggerated or reduced. For example, each configuration illustrated in the drawings is arbitrarily shown for understanding and ease of description, but the present invention is not limited thereto.

Hereinafter, exemplary embodiments of the present disclosure will be described in detail with reference to the accompanying drawings, in which like reference numerals refer to like or corresponding elements regardless of reference numerals and a duplicated description thereof will be omitted when the exemplary embodiments are described with reference to the drawings.

Terminal

First, in exemplary embodiments of the present disclosure, a terminal may provide to a user a mobile and/or web environment capable of using an online shopping mall through wire or wireless communication.

Further, the terminal may provide to the user an interface, service, data, information and the like from an online shopping mall server that performs a service for providing one or more similar products (or items) based on deep-learning by transmitting/receiving data to/from the online shopping mall server.

Here, the item may mean a product or goods sold in the online shopping mall.

Furthermore, in the exemplary embodiment, the terminal may receive an input of the user through various interfaces (e.g., an item selection interface, a search interface, and/or a bounding box selection interface) provided on the online shopping mall.

Specifically, in the exemplary embodiments of the present disclosure, the terminal may include, for example, but not limited to, a smart phone, a digital broadcasting terminal, a cellular phone, a personal digital assistants (PDA), a portable multimedia player (PMP), a navigation, a tablet, a personal computer (PC), a wearable device, and a smart glass which are portable terminals in which a shopping mall application or program for performing a service for providing an item similar to an item selected by the user based on deep-learning is installed.

Although some exemplary embodiments of the present disclosure describe the terminal as a portable terminal for illustration purposes only, any computer device capable of performing wire or wireless communication can be a terminal. For example, the terminal may further include devices in which an application for performing a service for providing a similar item based on deep-learning based wired/wireless communication is installed, such as personal computers including a desktop PC as a fixed terminal, a laptop computer, and an ultrabook.

FIG. 1 is a block diagram of a terminal according to an exemplary embodiment of the present disclosure.

Referring to FIG. 1, a terminal 100 may include a communication unit 110, an input unit 120, a display unit or display 130, a storage unit or storage 140, and a control unit (or controller or processor) 150.

First, the communication unit 110 may transmit/receive various data and/or information for performing a service for providing a similar item based on deep-learning.

In the exemplary embodiment, the communication unit 110 may transmit and/or receive data associated with the service for providing the similar item based on deep-learning through communication with a shopping mall server 200 and/or another user's terminal.

Further, the communication unit 110 may transmit and/or receive radio signals with a base station, an external terminal, and a predetermined server over a mobile communication network constructed according to technical standards or communication methods of mobile communication (e.g., Global System for Mobile communication (GSM), Code Division Multi Access (CDMA), High Speed Downlink Packet Access (HSDPA), High Speed Uplink Packet Access (HSUPA), Long Term Evolution (LTE), Long Term Evolution-Advanced (LTE-A), etc.).

Next, the input unit 120 may be configured to receive or sense inputs of the user associated with the service for providing the similar item based on deep-learning.

For example, the input unit 120 may receive or sense an input of the user through an item selection interface for selecting an item on the online shopping mall, an input of the user through an item search interface, and/or an input of the user through a bounding box selection interface.

Next, the display unit 130 may be configured to output or display various information associated with the service for providing the similar item based on deep-learning as a graphic image.

In the exemplary embodiment, the display unit 130 may display various images and/or texts posted in an online shopping mall web site as the graphic image.

The display unit 130 may include, for example, but not limited to, at least one of a liquid crystal display (LCD), a thin film transistor-liquid crystal display (TFT LCD), an organic light-emitting diode (OLED), a flexible display, a 3D display, and an electronic ink (e-ink) display.

Further, the input unit 120 and the display unit 130 may be combined together and implemented as a single device, for example, but not limited to, a touch screen.

Next, the storage unit 140 may store one or more of various application programs, data, and commands of performing the service for providing the similar item based on deep-learning according to the exemplary embodiment of the present invention.

The storage unit 140 may be various storage devices including, for example, but not limited to a ROM, a RAM, an EPROM, a flash drive, a hard drive, etc., a web storage, or any appropriate storage that can perform a storage function on the Internet.

The control unit 150 may control an overall operation of components included in the terminal 100 in order to perform the service for providing the similar item based on deep-learning.

For instance, the control unit 150 may be implemented using at least one of application specific integrated circuits (ASICs), digital signal processors (DSPs), digital signal processing devices (DSPDs), programmable logic devices (PLDs), field programmable gate arrays (FPGAs), controllers, micro-controllers, microprocessors, and electric units for performing other functions.

However, the components illustrated in FIG. 1 are examples only, and the terminal 100 described in the present disclosure may thus have components more or less than components listed above.

Shopping Mall Server

Meanwhile, in the exemplary embodiment of the present disclosure, the shopping mall server 200 may provide to the user's terminal 100 the online shopping mall that performs the service for providing the similar item based on deep-learning.

Further, in the exemplary embodiment of the present disclosure, the shopping mall server 200 may be configured to perform a series of data processing for searching or detecting and providing the similar item based on deep-learning.

Specifically, the shopping mall server 200 object-detects an item image to detect an object in the corresponding image and create a bounding box based on the detected object.

Here, the item image may be an image acquired by capturing or photographing the product sold in the online shopping mall.

More specifically, the shopping mall server 200 may recognize an object region in the item image and crop an appropriate region of the item image having the object by a bounding box having, for example, but not limited to, a rectangular box shape.

Specifically, the shopping mall server 200 recognizes an object related to a fashion and a region occupied by the object in order to perform fashion detection, and crops the bounding box for each fashion object.

For example, the shopping mall server 200 may include a fashion detection unit 400. The fashion detection unit 400 may include a first convolution neural network Conv 1 for passing an input item image through a convolution layer at least once and a second convolution neural network Conv 2 constituted by a roll pooling layer and softmax, and a bounding box regressor.

Specifically, the first convolution neural network Conv 1 may simultaneously receive entire image and object candidate regions as input.

In addition, the first convolution neural network Conv 1 processes the entire image through the convolution layer and a max-pooling layer and binds respective meaningful objects to create a feature map represented by feature regions.

Next, the second convolution neural network Conv 2 passes the roll pooling layer with respect to each object candidate region to crop a fixed-length feature vector from the feature map.

Here, the feature vector according to the exemplary embodiment may mean a variable for specifying a feature for the object on the corresponding image.

In addition, the second convolution neural network Conv 2 applies the cropped feature vector to a fully-connected layer (FCs) and then applies output data of the fully-connected layer (FCs) to softmax disposed at a final end to specify a type of each object.

In this case, the second convolution neural network Conv 2 may be learned to crop only a fashion associated object among the types of object.

Further, the second convolution neural network Conv 2 applies output data of the fully-connected layer to the bounding box regressor to crop a bounding box schematically representing a region occupied by the fashion associated object.

The fashion detection unit 400 constituted by the first convolution neural network Conv 1 and the second convolution neural network Conv 2 may specify that the type of object is a fashion associated item and crop a feature region occupied by the corresponding item to the bounding box.

In other words, the shopping mall server 200 may train and use a neural network used in a processor for providing the similar or related item based on deep-learning to be optimized to the fashion item and specify that the type of object on the item image is the fashion associated item through the trained neural network and crop the feature region occupied by the corresponding item to the bounding box.

Meanwhile, FIG. 2 is a block diagram of a shopping mall server 200 according to an exemplary embodiment of the present disclosure.

Referring to FIG. 2, the shopping mall server 200 may include a data transmitting/receiving unit or communication device 210, a processor or data processing unit 220, and a database 230.

First, the data transmitting/receiving unit 210 may transmit and receive various data for performing a deep-learning based computerized service for providing one or more similar or related items based on deep-learning with the terminal 100 and/or an external server through a network.

Further, the data processing unit 220 may perform a series of data processing for performing the service for providing the similar or related item based on deep-learning.

For example, the data processing unit 220 may perform image based deep-learning in link with a deep-learning neural network. Specifically, the data processing unit 220 may perform fashion detection associated deep-learning, deep-learning for cropping the feature vector of the image in the bounding box, etc.

Here, according to exemplary embodiments of the present disclosure, the deep-learning neural network may be directly installed in the shopping mall server 200 or perform deep-learning by receiving the image as a separate device from the shopping mall server 200.

Hereinafter, for illustration purposes only, the exemplary embodiment of the present disclosure will be described based on an exemplary embodiment in which the deep-learning neural network is directly installed in the shopping mall server 200 and performs deep-learning. However, the present disclosure is not limited to these exemplary embodiments. One having ordinary skill in the art can implement embodiments that perform deep-learning by receiving the image as a separate device from the shopping mall server 200 based on the exemplary embodiments of the present disclosure.

Specifically, the data processing unit 220 may read a deep-learning neural driving program and data from the database 230 and perform deep-learning according to a deep-learning neural network system constructed according to the read deep-learning neural driving program.

Further, the data processing unit 220 may also process a series of instructions or processes for the user to view and purchase one or more products by accessing the shopping mall through the terminal 100.

In the exemplary embodiment, when the user requests searching the similar or related product during the shopping or views or clicks a specific product, the data processing unit 220 searches and provides one or more products associated with or similar to the product that the user is interested in based on deep-learning to provide a similar or related product search service or function to the user.

The data processing unit 220 may be implemented using at least one of application specific integrated circuits (ASICs), digital signal processors (DSPs), digital signal processing devices (DSPDs), programmable logic devices (PLDs), field programmable gate arrays (FPGAs), controllers, micro-controllers, microprocessors, and electric units for performing other functions.

Meanwhile, the database 230 may store various data associated with the service for providing one or more similar or related items based on deep-learning.

As the exemplary embodiment, the database 230 may store the deep-learning neural network driving program and data and may be provided by a request of the data processing unit 220.

The database 230 may be various storage devices including a ROM, a RAM, an EPROM, a flash drive, a hard drive, etc., or a web storage that performs a storage function of the database 230 on the Internet.

Method for Detecting or Providing One or More Similar or Related Products Based on Deep-Learning Hereinafter, a method for searching or providing one or more similar or related items based on deep-learning will be described in detail with reference to the accompanying drawings.

The method for searching or providing one or more similar or related items based on deep-learning according to the exemplary embodiment of the present disclosure may be performed by a process of creating the database 230 for providing the similar or related items using the deep-learning and a process of searching or detecting the similar or related items from the created database 230 through the deep-learning and providing the detected similar or related items to the user.

<Method for Creating Database for Providing One or More Similar or Related Products>

First, FIG. 3 is a flowchart for illustrating a method for creating the database 230 of FIG. 2 for providing one or more similar or related products based on deep-learning according to an exemplary embodiment of the present disclosure.

A process of creating the database 230 for providing the similar products based on deep-learning may be performed by the data processing unit 220 (e.g., a processor of a computer of the shopping mall server 200) of the shopping mall server 200.

Hereinafter, for convenience of description, the data processing unit 220 of the shopping mall server 200 will be referred to as the shopping mall server 200.

Referring to FIG. 3, the shopping mall server 200 crops a feature vector of an image for an item posted in the online shopping mall (hereinafter, referred to as a "shopping mall") and makes and/or store the cropped feature vector into the database to be thereafter used as a database for searching a similar or related product of a specific item.

Specifically, the shopping mall server 200 may first acquire or receive an image of an item registered in the shopping mall and item information (S101). The item information may be information associated with or related to the item.

Here, the item may mean a product or goods sold in the shopping mall and an item image, or the image of the item, may be an image acquired by capturing or photographing the product or goods sold in the shopping mall.

Further, item information, or the information associated with or related to the item, may include category of the item, i.e., product group information in which items such as tops, bottoms, swim wears, and/or a dress are classified.

Subsequently, the shopping mall server 200 acquiring the item image and the item information may create one or more bounding boxes by object-detecting the item image acquired at S101 (S103).

For example, referring to FIG. 4, the shopping mall server 200 may object-detect the acquired item image based on deep-learning through an object detection unit, such as the data processing unit 220 of FIG. 2, and detect one or more objects in the corresponding image.

In addition, the shopping mall server 200 may crop at least one bounding box BBox in which an approximate region having the corresponding object has the rectangular box shape based on the detected object.

In this case, the shopping mall server 200 may train and use the deep-learning neural network to be optimized to a fashion item and specify that the type of the object on the item image is the fashion associated item through the trained neural network and crop the feature region occupied by the corresponding item to the bounding box.

In other words, the shopping mall server 200 may detect the fashion associated object in the item image and create a bounding box BBox including an image region representing the detected object.

For example, the shopping mall server 200 object-detects the acquired item image using a trained fashion detector optimized to the fashion item to create at least one bounding box BBox.

As such, the shopping mall server 200 performs data processing only for the fashion item image using deep-learning to provide an accurate and rapid similar item providing service based on the neural network and big data.

Next, the shopping mall server 200 that has created at least one bounding box with respect to the item image may determine the created bounding box for the corresponding item based on the acquired item information, and crop or extract a part of the image set by the determined bounding box as a main bounding box image (S105).

For instance, referring to FIG. 5, the shopping mall server 200 may detect a bounding box including an object matched with the acquired item information among one or more bounding boxes created through the fashion detection unit 400.

In addition, the shopping mall server 200 crops the part of the image in the detected bounding box to create the cropped image as the main bounding box image. The main bounding box image may be an image in at least one bounding box representing the corresponding item among a plurality of bounding boxes created from the item image.

As the exemplary embodiment, when the acquired item information is the 'top', the shopping mall server 200 may detect a top object matched with the 'top' and crop the image in the bounding box including the top object, which is detected as the main bounding box image.

Further, in the exemplary embodiment, when the acquired item information represents an item in which the top object and the bottom object constitute one set, such as 'bikini swim suit' and/or 'two-piece', the shopping mall server 200 may crop bounding boxes including the top object and the bottom object matched with the corresponding item information together and merge the cropped bounding boxes.

In addition, the shopping mall server 200 may crop the parts of the image set by the bounding boxes merging the bounding box of the top object and the bounding box of the bottom object as the main bounding box image.

As such, the shopping mall server 200 creates the bounding boxes for a plurality of objects which are present on the item image and detect only a bounding box including the corresponding item among the created bounding boxes to crop only a region associated with the item in the acquired item image and provides a deep-learning based similar item search function based on the cropped region to reduce a data processing load and enhance a search speed.

Moreover, the shopping mall server 200 may crop one or more bounding boxes according to the acquired item information, combine one or more cropped bounding boxes and create the combined bounding boxes as the main bounding box image representing the corresponding item to provide a similar item providing service having higher accuracy for each category of the item.

Next, the shopping mall server 200 creating the main bounding box image may padding-process the main bounding box image and adjust a size to create a padding image (S107).

In some exemplary embodiments of the present disclosure, the deep-learning neural network cropping a feature vector for the image may receive only an image having a specific size (e.g. a predetermined or preset size or range) as input data. However, since the size of the main bounding box image may be changed for each item, the size of the main bounding box image needs to be changed or adjusted to a size suitable for input into the deep-learning neural network.

In this case, when an existing aspect ratio having an original image is not maintained and the size of the image is changed, the feature vector for a style or a shape of the item may be distorted.

Accordingly, in the exemplary embodiment of the present disclosure, in order to input the main bounding box image into the deep-learning neural network, the padding processing may be performed in order to adjust the size of the main bounding box image while maintaining the existing aspect ratio.

For example, the padding processing may mean image processing of adding a pad image in order to adjust the size of an original image while maintaining the aspect ratio of the original image.

In this case, the pad image may be an image, which is created due to an insufficient size and inserted into both sides or one side of the original image when one-side size is smaller than an input size in an original image in which the aspect ratio is maintained and the size is adjusted may be an image which does not influence the deep-learning. For example, the pad image may be an image formed by a single color of a gray scale.

In other words, in the exemplary embodiment of the present disclosure, the shopping mall server 200 adds the pad image onto a main bounding box image of which size is adjusted to a predetermined size through the padding processing to adjust the main bounding box image according to the input size of the deep-learning neural network for cropping the feature vector.

For instance, referring to FIG. 6, in the shopping mall server 200, in order to use a created main bounding box image (a) as the input data of the deep-learning neural network for cropping the feature vector, a form of an item of a first image (b) created by changing a horizontal and/or vertical size of the corresponding image according to a predetermined limit size may be distorted.

In order to prevent the distortion of the image, the shopping mall server 200 may adjust the horizontal or vertical size of the main bounding box image. For example, the shopping mall server 200 may reduce the horizontal size of the main bounding box image while maintaining the aspect ratio according to the horizontal size of the input data.

Next, the shopping mall server 200 may add a pad image 5 to both sides of the main bounding box image to create a first padding image (c) in order to adjust the vertical size of the main bounding box image to the vertical size of the input data.

Alternatively, the shopping mall server 200 may add the pad image 5 to one side of the main bounding box image to create a second padding image (d) in order to adjust the vertical size of the main bounding box image to the vertical size of the input data.

In other words, the shopping mall server 200 performs padding processing of adding the pad image 5 created with a predetermined size to both sides or one side on the main bounding box image of which size is changed to create the padding image.

Through the padding processing, the shopping mall server 200 may create a padding image. The padding image may include a main bounding box image, in which the aspect ratio is maintained to be equal to that of the original image and the size is adjusted, and one or more pad images 5. Accordingly, the padding processing may prevent the image distortion that may be caused by the change to the size of the image suitable for inputting into the deep-learning neural network.

As such, the shopping mall server 200 maintains the aspect ratio of the original image even after the size of the image is changed through the padding processing to prevent distortion of the item shape and transform the original image according to the input data size of the deep-learning neural network.

Next, the shopping mall server 200 that creates the padding image may extract or crop a feature vector for the padding image created at S107 (S109).

Specifically, the shopping mall server 200 inputs the created padding image into the deep-learning neural network for extracting or cropping feature vectors to extract or crop a feature vector. The feature vector may a variable for specifying a feature for the object on the corresponding image.

In this case, the shopping mall server 200 may train and use the deep-learning neural network for extracting or cropping feature vectors so as to optimize crop features for items used for the fashion.

For example, the shopping mall server 200 may extract or crop a shape feature vector for the padding image using the deep-learning neural network for extracting or cropping feature vectors as illustrated in FIG. 7.

Further, in the exemplary embodiment, the shopping mall server 200 may extract or crop each feature vector for at least one parameter of texture, fabric, shape, style, and color parameters using the deep-learning neural network for extracting or cropping feature vectors.

For example, the shopping mall server 200 inputs the padding image into a deep-learning neural network for a texture feature vector to acquire a texture feature vector for the corresponding padding image. Further, by the same scheme, the shopping mall server 200 may acquire fabric, shape, style, and/or color feature vectors for the corresponding padding image through a fabric feature vector cropping deep-learning neural network, a shape feature vector cropping deep-learning neural network, a style feature vector cropping deep-learning neural network, and/or a color feature vector cropping deep-learning neural network.

As such, the shopping mall server 200 extracts or crops the feature vector for the padding image including the item object using the deep-learning neural network to acquire data to more effectively specify and manage the feature of the corresponding item and smoothly perform an automated service for detecting and providing the similar item based on deep-learning through the acquired data.

Next, the shopping mall server 200 that extracts or crops the feature vector for the padding image may create an integrated feature vector by reducing a dimension of the extracted or cropped feature vector (S111).

In this case, the dimension of the feature vector may be varied or diversified according to a scheme of deep-learning used for extracting or cropping feature vectors.

For instance, the dimension of the feature vector may be in proportion to the number of parameters to extract or crop the feature vector. When the shopping mall server 200 crops the feature vector for each parameter based on the texture, fabric, shape, style, and color parameters, the dimension of the feature vector may become 5 dimensions.

As the size of the dimension is larger, the database 230 may need more storage capability or space to store the feature vectors and more time and resources to search the feature vectors.

Therefore, in the exemplary embodiment of the present disclosure, the shopping mall server 200 may create the integrated feature vector acquired by reducing the dimension of the cropped feature vector through various algorithms.

For example, the shopping mall server 200 may reduce the dimension of the cropped feature vector using at least one technology of Principle Component Analysis (PCA), Independent Component Analysis (ICA), Non-negative matrix factorization, and Singular Value Decomposition (SVD) and create the integrated feature vector through the reduction.

The shopping mall server 200 may reduce the dimension of the cropped feature vector by combining the cropped feature vectors for each parameter into one through a predetermined algorithm and create the integrated feature vector.

As such, the shopping mall server 200 may perform data processing of reducing the dimension of the feature vector extracted or cropped from the padding image to more efficiently making the feature vector into the database and reduce a time, resource and cost required for searching the similar or related item in the database 230 afterwards.

Next, the shopping mall server 200 which creates the integrated feature vector may store the created integrated feature vector in the database 230 and then use the corresponding database 230 as the search database 230 for searching the similar or related item (S113).

Specifically, the shopping mall server 200 may detect the corresponding similar or related item based on the integrated feature vector stored in the database 230 at the time of detecting and providing the similar or related item based on the item selected according to the input of the user afterwards.

More specifically, the shopping mall server 200 may search the database 230 using various schemes of algorithms (e.g., FLANN, annoy and/or Brute Force) and measure a similarity between the item selected by the user and the item searched on the database 230 based on the integrated feature vector.

In addition, the shopping mall server 200 may detect a predetermined number of items which are the most similar with the item selected by the user and have the measured similarity higher than a predetermined criterion (e.g., a predetermined percentage, etc.) from the database 230 and derive the detected items as a search result.

Further, the shopping mall server 200 may select the predetermined number of the items as the similar or related items and provide the selected similar or related items in link with the terminal 100.

As such, the shopping mall server 200 may implement the automated service for providing similar or related items based deep-learning to provide convenience of basic usability for the shopping mall and provide a more fast and efficient search method than the conventional method.

<Method for Detecting One or More Similar or Related Products from Database Through Deep-Learning and Providing the Detected Similar or Related Products>

FIG. 8 is a flowchart for illustrating a method for detecting and providing one or more similar related products from the database 230 based on deep-learning according to an exemplary embodiment of the present disclosure.

A process of detecting the similar or related products based on the deep-learning, which is performed below may be performed by the control unit 150 of the terminal 100.

Hereinafter, for convenience of description, the control unit 150 of the terminal 100 will be abbreviated and described as the terminal 100.

In addition, hereinafter, it will be described that the shopping mall server 200 becomes a subject and searches the similar product through the deep-learning, but an exemplary embodiment in which the terminal 100 becomes the subject and searches the similar product may also be included.

Referring to FIG. 8, the shopping mall server 200 may extract or crop the feature vector for the image of the item selected by the user and detect one or more similar or related items in the database 230 based on the extracted or cropped feature vector and provide the detected similar or related items to the user.

Hereinafter, for effective description, a duplicated description with the described contents may be omitted.

Specifically, the shopping mall server 200 may first acquire an item image and item information based on an input of a user (S201). The item image is a image of an item, and the item information is information associated with or related to the item.

More specifically, the shopping mall server 200 may acquire the item image and the item information for the item selected according to the input of the user among a plurality of items posted on the shopping mall server 200 in link with the terminal 100.

Further, the shopping mall server 200 may acquire the item image and the item information based on the image input or selected by the user through an interface provided by the shopping mall server 200 in link with the terminal 100.

Specifically, the shopping mall server 200 may acquire the image input or selected by the user through an image input interface provided by the shopping mall server 200 or stored in the user's terminal 100 and determine whether there is an item, which is the same as or similar to the item included in the corresponding image, in the shopping mall server 200 by performing deep-learning based on the acquired image. For example, the determination of whether there is an item, which is the same as or similar to the item included in the corresponding image, in the shopping mall server 200 can be made based on whether the similarities between the image input or selected by the user and items stored in the shopping mall server 200 are greater than a predetermined threshold or within a predetermined range.

In addition, the shopping mall server 200 may acquire the item image and the item information based on the item determined as the same as or similar to the item input or selected by the user.

In other words, the shopping mall server 200 provides an item search function based on the image through the image input interface to search the item through the image even when the name for the item to be searched by the user or category into which the corresponding item is classified is not known or provided.

Next, the shopping mall server 200 that acquires the item image and the item information may create one or more bounding boxes by object-detecting the item image acquired at S201(S203).

Specifically, the shopping mall server 200 may object-detect the acquired item image based on deep-learning through the fashion detection unit 400 and detect one or more objects in the corresponding image.

In addition, the shopping mall server 200 may create one or more bounding boxes in which an approximate region having the corresponding object has the rectangular box shape based on the detected object. Although the bounding box is illustrated as a rectangular shape in FIGS. 4 and 5, the bounding box can have any appropriate shape, for example, but not limited to, a polygon, trapezoid, triangle, circle, oval and the like.

Next, the shopping mall server 200 that creates the bounding box may select a search target item based on one or more detected objects (S205).

For example, in the exemplary embodiment, the shopping mall server 200 may automatically select the search target item based on the acquired item information, i.e., the item information of the item selected according to the input of the user.

Specifically, the shopping mall server 200 may detect an object matched with or corresponding to the acquired item information using deep-learning among one or more bounding boxes through the fashion detection unit 400.

In addition, the shopping mall server 200 may select the detected object as the search target item.

In another exemplary embodiment, referring to FIG. 9, the shopping mall server 200 may display an item image including one or more bounding boxes through the display and/or input units 130 and/or 120 (e.g. a touch screen) of the terminal 100.

In addition, the shopping mall server 200 may select the objects included in the bounding box set or selected by the user as the search target item based on the displayed item image.

In other words, the shopping mall server 200 may provide a similar item detection service having higher utilization and accuracy to the user who uses the shopping mall online service by widening a selection width for the object for which the user intends to search the similar or related item based on a plurality of objects detected from the item image.

Further, the shopping mall server 200 automatically selects the search target item according to a setting or situation (e.g., setting preselected by the user, etc.) or selects the search target item according to selection of the user to enhance the satisfaction of the user through differentiated search service.

Next, the shopping mall server 200 that selects the search target item may create the main bounding box image for the selected item and create the padding image according to the created main bounding box image (S207).

Specifically, the shopping mall server 200 may first crop a portion of the item image disposed in the bounding box including the selected search target item and create the main bounding box image based on the cropped portion of the image disposed in the bounding box.

In other words, the main bounding box image is an image in at least one bounding box representing the search target item among a plurality of bounding boxes created from the item image.

Further, the shopping mall server 200 that creates the main bounding box image may padding-process the created main bounding box image and adjust the size to create the padding image.

Specifically, in order to create the padding image, the shopping mall server 200 may adjust the horizontal or vertical size of the main bounding box image. For example, the shopping mall server 200 may reduce the horizontal size of the main bounding box image while maintaining the aspect ratio according to the horizontal size of the input data.

Next, the shopping mall server 200 may create the padding image by adding the pad image 5 of FIG. 6 to both sides or one side of the main bounding box image in order to adjust the vertical size of the main bounding box image to the vertical size of the input data.

In other words, the shopping mall server 200 performs the padding processing of adding the pad image 5 created with a predetermined size to both sides or one side on the main bounding box image of which size is changed to create the padding image.

Through the padding processing, the shopping mall server 200 may create a padding image. The padding image may include a main bounding box image, in which the aspect ratio is maintained equal to that of the original image and the size is adjusted, and the pad image 5.

Subsequently, the shopping mall server 200 may extract or crop a feature vector for the created padding image (S209).

Specifically, the shopping mall server 200 inputs the created padding image into the deep-learning neural network for extracting or cropping the feature vector to extract or crop a feature vector. The feature vector may be a variable for specifying a feature for the object on the corresponding image.

In this case, the shopping mall server 200 may extract or crop each feature vector for at least one parameter of texture, fabric, shape, style, and color parameters using the feature vector cropping deep-learning neural network for each parameter.

Next, the shopping mall server 200 that extracts or crops the feature vector for the padding image may create the integrated feature vector by reducing the dimension of the extracted or cropped feature vector (S211).

For example, the shopping mall server 200 may reduce the dimension of the extracted or cropped feature vector using, for example, but not limited to, at least one technology of Principle Component Analysis (PCA), Independent Component Analysis (ICA), Non-negative matrix factorization, and Singular Value Decomposition (SVD) and create the integrated feature vector through the reduction.

In other words, the shopping mall server 200 performs the data processing of reducing the dimension of the feature vector to more efficiently make the feature vector into the database and reduce time, resource and cost required for searching the similar or related item in the database 230 afterwards.

Next, the shopping mall server 200 that creates the integrated feature vector may detect an integrated feature vector in which the similarity with the created integrated feature vector is higher than a predetermined criterion (e.g., a predetermined percentage, etc.) from the database 230 (S213).

Specifically, the shopping mall server 200 may search the database 230 using various schemes of algorithms (e.g., FLANN, annoy and/or Brute Force) and measure a similarity between the item selected by the user and the item stored on the database 230 based on the integrated feature vector.

In addition, the shopping mall server 200 may detect a predetermined number n (1<=n) of items which are the most similar with the item selected by the user and have the measured similarity which is higher than a predetermined criterion (e.g., a predetermined percentage, etc.) from the database 230 and select the predetermined number n of the detected items as the similar item.

As such, the shopping mall server 200 searches one or more items similar or related to the item selected by the user based on the integrated feature vector in order to select a similar item having high accuracy and reliability cropped based on objective data and perform a deep-learning based service for providing a similar or related item through efficient data processing.

Further, the shopping mall server 200 which selects the similar or related item may provide the selected similar or related item to the user in link with the terminal 100 (S215).

In other words, the shopping mall server 200 detects at least one item similar or related to the item selected by the user and provides the detected similar or related item through the terminal 100 to enhance the competitiveness of the shopping mall and the satisfaction of the user.

Hereinabove, according to some exemplary embodiments of the present disclosure, a system and method for providing similar or related items based on deep-learning may detect and provide an item similar to a target item by deep-learning an object region for an image of an item selected by a user to provide convenience of basic usability of an online shopping mall and provide an enhanced search method differentiated from a conventional method, thereby increasing competitiveness of the online shopping mall.

Specifically, according to certain exemplary embodiments of the present disclosure, a system and method for providing similar or related items based on deep-learning may detect and provide at least one item similar to an item selected by a user to conveniently identify items classified into similar or related items, thereby enhancing speed, accuracy and performance for searching items by using the deep-learning and satisfaction of the user for an online shopping mall.

Further, according to some exemplary embodiments of the present disclosure, a system and method for providing similar or related items based on deep-learning may detect and provide an item similar to an item selected by a user to maximize satisfaction and reflection of needs of a user who intends to easily and rapidly identify the item similar to the selected item and minimize a movement line.

In addition, according to certain exemplary embodiments of the present disclosure, a system and method for providing similar or related items based on deep-learning may detect and provide an item similar or related to an item selected by a user to guide the user to identify and purchase an item similar or related to the item that the user is looking for even when an item to be purchased by the user is sold out.

Further, according to some exemplary embodiments of the present disclosure, a system and method for providing similar or related items based on deep-learning may provide a function of detecting a similar or related item by performing deep-learning based on an image input or selected by a user to enable the user to easily find the corresponding item by a search method different from conventional technology even when it is difficult to find a desired item by a conventional search method (e.g., category, keyword search, etc.) because the user does not know a name for the item.

In addition, according to certain exemplary embodiments of the present disclosure, a system and method for providing similar or related items based on deep-learning may perform data processing for an item image using a trained deep-learning neutral network to accurately and rapidly provide an online service of detecting and providing an item similar or related to a selected item based on a neutral network and big data.

However, the effect which may be obtained in the present invention is not limited to the above-mentioned effects, and other effects not mentioned may be clearly understood from the following description.

The operations according to the exemplary embodiments described above can be implemented in a form of a program command which may be executed through various computer components means and may be recorded in the computer readable recording medium. The computer readable recording medium may include singly a program command, a data file, or a data structure or a combination thereof. The program command recorded in the computer readable recording medium may be specially designed and configured for the present invention, or may be publicly known to and used by those skilled in the computer software field. Examples of the computer readable recording media may include a hardware device particularly configured to store and execute program commands, magnetic media such as hard disks, floppy disks, and magnetic tape, optical recording media such as CD-ROM disks and DVD, magneto-optical media such as floptical disks, ROM, RAM, and flash memories. Examples of the program commands include a high-level language code executable by a computer by using an interpreter, and the like, as well as a machine language code created by a compiler. The hardware devices may be changed to one or more software modules in order to perform the processing according to the present invention, and an opposite situation thereof is available.

Specific executions described in the present disclosure are exemplary embodiments and the scope of the present invention is not limited even by any method. For brevity of the specification, descriptions of conventional electronic configurations, control systems, software, and other functional aspects of the systems may be omitted. Further, connection or connection members of lines among components exemplarily represent functions connections and/or physical or circuitry connections and may be represented as various functional connections, physical connections, or circuitry connections which are replaceable or added in an actual device. Further, unless otherwise specified, such as "essential", "important", etc., the connections may not be components particularly required for application of the present invention.

Further, in the detailed description of the present disclosure, which is described, while the present disclosure has been described with respect to the preferred embodiments, it will be understood by those skilled in the art or those skilled in the art having ordinary knowledge in the technical field that various changes and modifications of the present invention may be made without departing from the spirit and the technical scope of the invention disclosed in the following claims. Therefore, the technical scope of the present invention should not be limited to the contents described in the detailed description of the specification but should be defined by the claims.

What is claimed is:

1. A method for generating a database for providing similar or related products based on deep-learning, which is performed by a processor of a shopping mall server, the method comprising:
   acquiring an image of an item and item information associated with the item;
   detecting one or more objects associated with the item in the image and setting one or more bounding boxes for the detected one or more objects in the image;
   selecting a bounding box including an object associated with the item among the set one or more bounding boxes based on the item information;
   cropping a portion of the image disposed in the selected bounding box, and performing padding-processing to the cropped portion of the image disposed in the selected bounding box;
   extracting a feature vector from the cropped and padding-processed portion of the image; and
   storing the feature vector associated with the item in the database.

2. The method of claim 1, wherein the detecting of the one or more objects and the setting of the one or more bounding boxes includes detecting one or more fashion-related objects from the image and setting the one or more bounding boxes for the one or more fashion-related objects in the image of the item.

3. The method of claim 2, wherein the selecting of the bounding box including the object associated with the item among the set one or more bounding boxes based on the item information includes selecting the bounding box including the object associated with the item among the detected fashion related objects.

4. The method of claim 3, wherein the cropping of the portion of the image in the selected bounding box includes, when a plurality of the bounding boxes are set for a plurality of the objects associated with the item, merging the plurality of bounding boxes and cropping a portion of the image disposed in the merged bounding boxes.

5. The method of claim 1, wherein the performing of the padding-processing includes:
   changing a size of the cropped portion of the image disposed in the selected bounding box image to a predetermined size, and
   adding one or more pad images to the cropped and size-changed portion of the image.

6. The method of claim 1, wherein the extracting of the feature vector from the cropped and padding-processed portion of the image includes extracting a feature vector associated with at least one parameter of texture, fabric, shape, style, and color using a deep-learning neural network.

7. The method of claim 1, further comprising:
   creating an integrated feature vector by reducing a dimension of the extracted feature vector,
   wherein the storing of the feature vector associated with the item in the database includes storing the item information with the integrated feature vector in the database.

8. A method for detecting similar or related products through deep-learning, which is performed by a processor of a shopping mall server, and transmitting the detected similar or related products to a terminal of a user, the method comprising:
   acquiring an image of an item selected by the user and item information of the item selected by the user;
   detecting one or more objects associated with the item in the image and generating one or more bounding boxes for the detected one or more objects;
   determining a search target item based on the detected one or more objects;
   cropping a portion of the image disposed in a bounding box of an object associated with the search target item, and performing padding-processing to the cropped portion of the image disposed in the bounding box of the object associated with the search target item;
   extracting a feature vector by deep-learning the cropped and padding-processed portion of the image; and
   detecting an item among items stored in a database based on a similarity between the feature vector extracted by the deep-learning and feature vectors of the items stored in the database and transmit the detected item to the terminal of the user.

9. The method of claim 8, wherein the acquiring of the image of the item and the item information includes:
   providing an interface configured to receive an input of the user related to selection of the item; and
   acquiring the image and the item information of the item selected according to the input of the user among a plurality of items posted on the shopping mall server.

10. The method of claim 8, wherein the determining of the search target item based on the detected one or more objects includes automatically determining the search target item based on the item information.

11. The method of claim 10, wherein the determining of the search target item based on the detected one or more objects further includes:
   displaying, by the terminal, the image of the item with the generated one or more bounding boxes,
   receiving, by the terminal, the user's selection of one of the generated one or more bounding boxes, and
   determining an object included in the one of the generated one or more bounding boxes selected by the user as the search target item.

12. The method of claim 8, wherein the selecting of an item among items stored in the database includes detecting a predetermined number of items, which are the most similar with the search target item and have similarity higher than a predetermined criterion, from the database.

13. An apparatus for providing one or more similar or related products using deep-learning, the apparatus comprising:
   a communication unit configured to transmit and receive data associated with a shopping service to and from a shopping mall server;
   a storage unit configured to store the data associated with the shopping service;
   a display unit configured to output the data associated with the shopping service including an image of a product selected by a user; and
   a processor configured to provide one or more images of one or more similar or related products associated with the image of the product selected by the user,
   wherein the processor is configured to:
   acquire the image of the product selected by the user and product information of the product selected by the user,
   detect one or more objects in the image of the product and create one or more bounding boxes for the detected one or more objects,
   determine a search target product based on the detected one or more objects,
   crop a portion of the image disposed in a bounding box of an object associated with the search target product, and perform padding-processing to the cropped portion of the image disposed in the bounding box of the object associated with the search target item, extract a feature vector by deep-learning the cropped and padding-processed portion of the image, detect a product among products stored in the database based on a similarity between the feature vector extracted by the deep-learning and feature vectors of the products stored in the database, and output the detected product through the display unit.

14. The apparatus of claim 13, wherein the processor is configured to:

provide an interface configured to receive an input of the user associated with selection of the product, and acquire the product image and the product information of the product selected according to the input of the user among a plurality of product images output to the display unit.

15. The apparatus of claim 13, wherein the processor is configured to automatically determine one of a plurality of products included in the product image as the search target product based on the product information.

16. The apparatus of claim 15, wherein the processor is configured to:

display the product image with the created one or more bounding boxes through the display unit, receive the use's selection of one of the created one or more bounding boxes, and determine an object included in the one of the created one or more bounding boxes selected by the user as the search target product.

17. The apparatus of claim 13, wherein the processor is configured to detect a predetermined number of products, which are the most similar with the search target product and have similarity higher than a predetermined criterion, from the database of the shopping mall server through the communication unit.

* * * * *